(12) United States Patent
Harrington et al.

(10) Patent No.: US 6,853,687 B2
(45) Date of Patent: *Feb. 8, 2005

(54) PROXIMITY-BASED MAGNETIC FIELD GENERATOR FOR CONTROLLING OPERATION OF RF BURST-TRANSMITTING TAGS OF GEOLOCATION SYSTEM

(75) Inventors: Timothy C. Harrington, Los Gatos, CA (US); Ronald J. Hash, Rogersville, TN (US); Donald K. Belcher, Rogersville, TN (US)

(73) Assignee: WhereNet Corp, San Ramon, CA (US)

( * ) Notice: Subject to any disclaimer, the term of this patent is extended or adjusted under 35 U.S.C. 154(b) by 786 days.

This patent is subject to a terminal disclaimer.

(21) Appl. No.: 09/759,290

(22) Filed: Jan. 11, 2001

(65) Prior Publication Data

US 2002/0077710 A1 Jun. 20, 2002

Related U.S. Application Data

(63) Continuation-in-part of application No. 09/689,340, filed on Oct. 12, 2000, now Pat. No. 6,476,719.
(60) Provisional application No. 60/175,642, filed on Jan. 12, 2000.

(51) Int. Cl.[7] .................................................. H04L 27/00
(52) U.S. Cl. ........................................ 375/259; 375/272
(58) Field of Search ................................. 375/259, 272; 340/825.36, 525, 539, 572.1, 551; 700/13; 342/126, 450

(56) References Cited

U.S. PATENT DOCUMENTS

| | | | |
|---|---|---|---|
| RE32,627 E | 3/1988 | Humble et al. | 340/572 |
| 5,103,459 A | 4/1992 | Gilhousen et al. | 375/1 |
| 5,432,841 A | 7/1995 | Rimer | 379/59 |
| 5,437,057 A | 7/1995 | Richley et al. | 455/41 |
| 5,481,588 A | 1/1996 | Rickli et al. | 379/32 |
| 5,485,632 A | 1/1996 | Ng et al. | 455/51.2 |
| 5,561,701 A | 10/1996 | Ichikawa | 379/57 |
| 5,644,108 A | 7/1997 | Katsurahira et al. | 178/18 |
| 5,103,459 A | 7/1999 | Gilhousen et al. | 375/206 |
| 5,920,261 A * | 7/1999 | Hughes et al. | 340/568.8 |
| 5,920,287 A * | 7/1999 | Belcher et al. | 342/450 |
| 5,995,046 A * | 11/1999 | Belcher et al. | 342/450 |
| 6,476,719 B2 * | 11/2002 | Belcher et al. | 340/572.1 |

* cited by examiner

Primary Examiner—Don N. Vo
(74) Attorney, Agent, or Firm—Allen, Dyer, Doppelt, Milbrath & Gilchrist, P.A.

(57) ABSTRACT

An object tracking system for locating radio-tagged objects within a monitored environment has a plurality tag transmission readers that detect RF transmissions from the tags, and generate output signals representative of the time-of-arrival of first-to-arrive tag transmissions. An object location processor processes the first to arrive signals in accordance with a multilateration algorithm to geolocate a tag. In order to modify the operation of a tag that comes within a prescribed region of the monitored environment (such as passing through a doorway), one or more relatively short range, magnetic field proximity-based, tag-programming 'pingers', are placed proximate to the region. A magnetic field receiver on the tag detects the field generated by the pinger and causes the tag to change operation such as increase its RF transmission rate.

20 Claims, 5 Drawing Sheets

PROXIMITY-BASED MAGNETIC FIELD GENERATOR FOR CONTROLLING OPERATION OF RF BURST-TRANSMITTING TAGS OF GEOLOCATION SYSTEM

CROSS-REFERENCE TO RELATED APPLICATION

The present application claims the benefit of U.S. Provisional Patent Application Ser. No. 60/175,642, by T. Harrington et al, filed Jan. 12, 2000, entitled: "Pinger Attributes Disclosure," and is a continuation-in-part of U.S. Non-Provisional Patent Application Ser. No. 09/689,340, filed Oct. 12, 2000, now U.S. Pat. No. 6,476,719 by R. Hash et al, entitled: "Data Communication System Harnessing Frequency Shift Keyed Magnetic Field," (hereinafter referred to as the '340 application), each application being assigned to the assignee of the present application and the disclosures of which are incorporated herein.

FIELD OF THE INVENTION

The present invention relates in general to object geolocating and tracking systems of the type described in U.S. Pat. to Belcher et al, Nos. 5,920,287, and 5,995,046, assigned to the assignee of the present application and the disclosures of which are incorporated herein, and is particularly directed to the use of an encoded AC magnetic field generator that is operative to controllably program the operation of one or more RF burst-transmitting tags that come within a prescribed proximity of the tag-programming generator.

BACKGROUND OF THE INVENTION

FIG. 1 diagrammatically illustrates the overall architecture of a tagged object geolocation system of the type described in the above-referenced Belcher et al Patents, as comprising a plurality of tag emission readers 10 geographically distributed within and/or around an asset management environment 12. This environment contains a plurality of objects/assets 14, whose locations are to be monitored on a continuous basis and reported to an asset management data base 20, which is accessible by way of a computer workstation or personal computer 26. Each of the tag emission readers 10 monitors the asset management environment for RF emissions from one or more RF-transmitter-containing tags 16 that are affixed to the objects 14. Each tag's transmitter is configured to repeatedly transmit or 'blink', a very short duration, wideband (spread spectrum) pulse of RF energy, that is encoded with the identification of its associated object and other information that may be stored in a tag memory.

These blinks or bursts of RF energy emitted by the tags are monitored by the readers 10, which are installed at fixed, and relatively unobtrusive locations within and/or around the perimeter of the environment being monitored, such as doorway jams, ceiling support structures, and the like. The output of each tag reader 10 is coupled to an associated reader processor. The reader processor correlates the spread spectrum RF signals received from a tag with a set of spread spectrum reference signal patterns, to determine which spread spectrum signals received by the reader is a first-to-arrive RF spread spectrum signal burst transmitted from the tag.

The first-to-arrive signals extracted by the reader output processors are forwarded to an object location processor within the processing subsystem 24. Using time-of-arrival differentiation of the detected first-to-arrive transmissions, the object location processor executes a prescribed multilateration algorithm to locate (within a prescribed spatial resolution (e.g., on the order of ten feet) the tagged object of interest.

In their normal mode of operation, the tags transmit or 'blink' at a relatively slow repetition rate, since most of the objects being tracked do not move frequently. However, there are times when the objects to which the tags are attached are moved and may pass through certain 'increased sensitivity' regions of the monitored environment where more frequent tag transmissions are desired, in order to ensure that any objects passing therethrough would be tracked. One way to accomplish this would be to simply program the tags to blink more frequently on a continuous basis.

This approach is not acceptable for two reasons. First, more frequent tag transmissions on a continuous basis will shorten the battery life of the tag; secondly it would increase spectrum congestion. In a similar fashion, there may be regions where changing a tag function is desired, such as stopping the tag from blinking or causing it to start blinking, or to transmit additional data acquired from optional sensors or a data bus.

SUMMARY OF THE INVENTION

In accordance with the present invention, the above-described objective is accomplished by placing an arrangement of one or more relatively short range, magnetic field proximity-based, tag-programming 'pingers' at a respective location of the monitored environment that is proximate to a region (such as a doorway) through which a tag may pass. This tag-programming pinger arrangement is operative to emit an AC magnetic field encoded with information, such as but not limited to programming information, data or a stimulus, that will be coupled to any tag passing through that region. As a non-limiting example, the information may comprise a reprogramming message, that is operative to cause the tag to immediately begin blinking at an increased rate for a relatively brief period of time, so as to alert the tracking system of the presence of the tag in the region. The tag's transceiver is modified to incorporate a magnetic field sensor that will enable the tag to appropriately respond to the encoded AC magnetic field generated by the pinger.

Pursuant to a non-limiting, but preferred embodiment, each of the magnetic field generator or pinger and the tag-installed magnetic field sensor may be respectively configured as described in the above referenced '340 application. The pinger generates a non-propagating AC magnetic field modulated with frequency shift keyed (FSK) modulation signals representative of digital data to be transmitted to the tag. The magnetic field generator includes an analog section that generates and FSK-modulates the non-propagating magnetic field, and a digital section that converts stored or incoming digital data into switch control signals. The switch control signals controllably switch capacitor components in circuit with a magnetic field coil, thereby modulating the resonant frequency of an inductor-capacitor (LC) tank circuit, to effect FSK-modulation of the magnetic field in accordance with the digital data.

The magnetic field coil is small compared to the operating frequency and volumetric extent of its generated magnetic field, so that energy in the magnetic field is not propagated. Under supervisory digital control of a zero-crossing detector, that is coupled in parallel with the resonant LC tank circuit, a pumping switch is periodically operated in a fly-back manner, to provide a DC current boost to the magnetic field coil from its DC power supply, compensating for resistive losses in the tank circuit.

Zero crossing points of the resonant frequency signal are supplied to a microcontroller which controls capacitor insertion switches of a multi-capacitor circuit, producing FSK modulation of the resonant magnetic field. During calibration, tuning capacitors may be controllably switched in and out of the resonator tank circuit to determine optimum frequency matches for a desired FSK frequency pair. During normal operation, calibration-based 'best match' capacitors are switchably coupled in parallel with a base capacitor, to precisely define a pair of resonant frequencies associated with the binary states of the digital data. An alternate pinger embodiment eliminates the multi-capacitor circuit and employs a microcontroller to generate and control pulse timing and duration used to pump the field coil.

The receiver unit includes LC tank detector circuit that includes a magnetic field-sensing coil in parallel with an associated capacitor. The LC tank circuit resonates at a frequency between the two FSK frequencies employed by the transmitter unit. The resonant detector circuit is coupled to a sense amplifier, which amplifies the voltage produced by the tank circuit for the desired receiver sensitivity and buffers the detected voltage to the level used by a digital receiver—demodulator.

The digital receiver is referenced to a clock frequency that corresponds to the difference between the two frequencies of the selected FSK modulation pair. The digital receiver contains two signal buffer paths, that operate on alternate sample periods one-half the period of the received data symbol rate, so that at least one of the two buffer paths will not be sampling data during transitions in the received FSK frequency. The demodulated data is buffered, so that it may be clocked out to control circuitry in the tag transceiver.

The augmented tag transceiver includes an oscillator coupled to a variable pseudo random (PN) pulse generator. The variable PN generator is normally operative to generate series of relatively low repetition rate randomly occurring 'blink', pulses that are coupled to a high speed PN spreading sequence generator. These blink pulses define when the tag randomly transmits or 'blinks'. The PN generator is also coupled to receive a control signal on from the magnetic field receiver. In response to the tag's magnetic field sensing circuitry demodulating an immediate blink message, FSK-modulated onto the magnetic field generated by the magnetic field pinger, it may couple a blink rate override signal to the variable PN generator, which temporarily by-passes the pulse rate at which 'blink' pulses are produced by variable PN generator and generates a series of rapid pulses which are coupled to the high speed PN spreading sequence generator. This serves to alert the tracking system of the proximity of the tagged object to an 'increased sensitivity', region where the magnetic field generator is installed.

In response to an enabling 'blink', pulse, the high speed PN spreading sequence generator generates a prescribed spreading sequence of PN chips. The PN spreading sequence generator is driven at the RF frequency output of a crystal oscillator which provides a reference frequency for a phase locked loop to establish a prescribed output frequency (for example a frequency of 2.4 GHz, to comply with FCC licensing rules). The RF output of the PLL is coupled to a mixer the output of which is coupled to an RF power amplifier for transmission. The mixer is also coupled to the output of a spreading sequence modulation exclusive-OR gate, which is coupled to receive the PN spreading chip sequence generated by the high speed PN generator. The exclusive-OR gate is also coupled to receive data stored in a tag data storage memory as clocked out by the PN spreading sequence generator.

The tag memory stores a multibit code representative of the identification of the tag, and additional parameter data, such as that provided by an associated sensor installed on or external to the tag. A data select logic circuit is coupled to receive data transmitted to the tag by the FSK-modulated magnetic field pinger, and demodulated by the magnetic field sensing circuit. When a magnetic field-modulated message from the magnetic field generator is detected by the tag's receiver, data in the decoded message is written into memory. The demodulator also couples a signal to enable the PN generator, so that the tag's transmitter will immediately generate a response RF burst, in the same manner as it randomly and repeatedly 'blink' a PN spreading sequence transmission containing its identification code and any parameter data stored in memory. In addition, it increases the output pulse rate of the tag's blink PN generator, so that the tag will blink at an increased rate, for a preset time duration as desired for tracking.

DETAILED DESCRIPTION

Before detailing the magnetic field proximity-based tag programming arrangement of the present invention, it should be observed that the invention resides primarily in a magnetic field-based augmentation to the geolocation system of the type described in the above-referenced Belcher et al Patents. In particular, the present invention involves placing a relatively short range, magnetic field proximity-based tag-programming (or 'pinger') arrangement at a location of the monitored environment that is proximate to a region (such as a doorway) through which a tagged object may pass. This tag-programming pinger is configured to emit an AC magnetic field encoded with information, such as but not limited to programming information, data or a stimulus, that is coupled to and sensed by a magnetic field-responsive receiver in any tag passing through the region.

As will be described, the invention is readily implemented as an arrangement of RF and magnetic field communication circuits and associated digital signal processing components and attendant supervisory control circuitry therefor, that controls the operations of such circuits and components. The configuration of such circuits components and the manner in which they interface with other communication system equipment have, accordingly, been illustrated in readily understandable block diagram format, depicting details that are pertinent to the present invention, so as not to obscure the present disclosure with details which will be readily apparent to those skilled in the art having the benefit of the description herein. Thus, the block diagram illustrations are primarily intended to show the major components of a tag-based geolocation system in a convenient functional grouping, whereby the present invention may be more readily understood.

Figure 1:
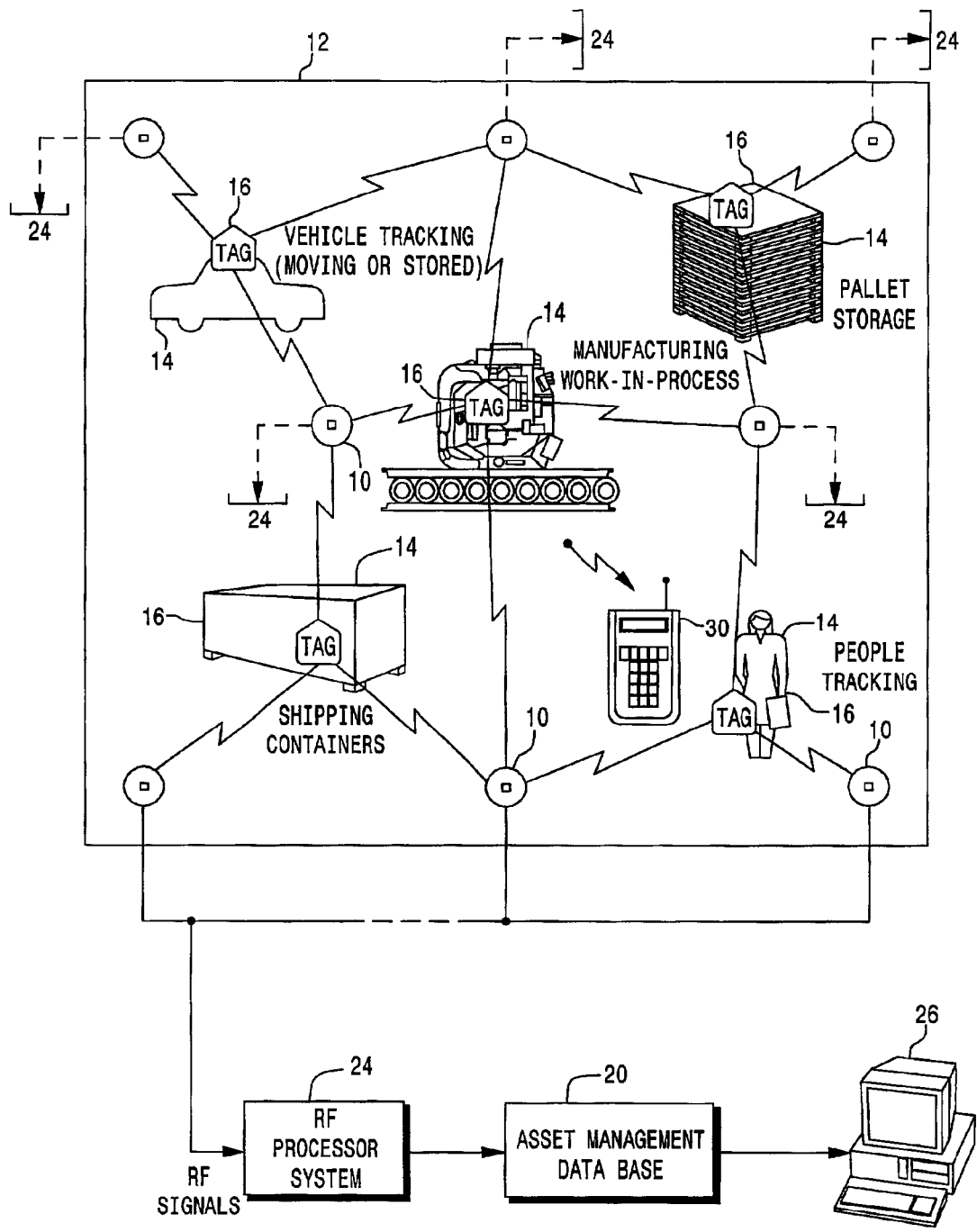
FIG. 1 diagrammatically illustrates the general architecture of a tagged object tracking and location system detailed in the U.S. Patents to Belcher et al, U.S. Pat. Nos. 5,920,287, and 5,995,046.
Figure 2:
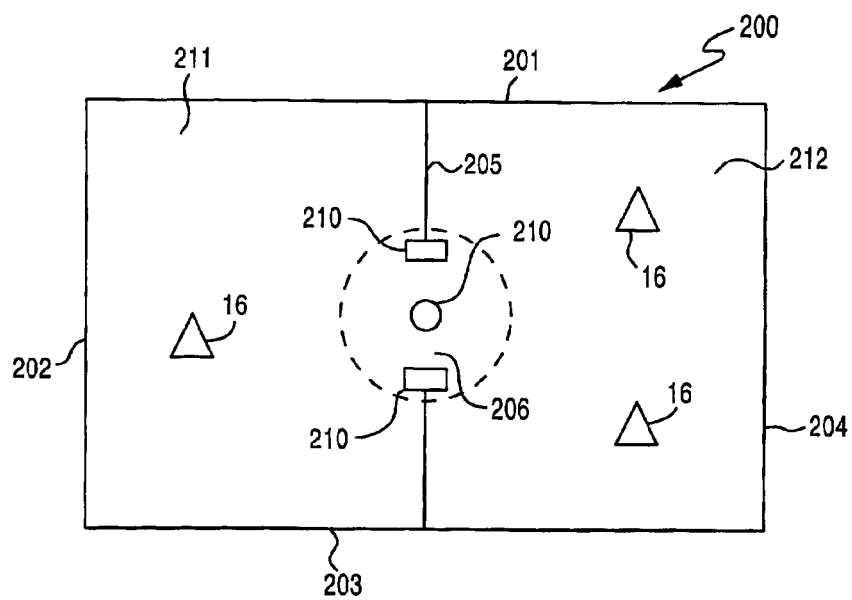
FIG. 2 is a diagrammatic plan view of a reduced complexity monitored environment in which a geolocation system of the type disclosed in the above-referenced U.S. Patents to Belcher et al, and shown FIG. 1 may be installed.

Attention is now directed to FIG. 2, which is a diagrammatic plan view of a reduced complexity monitored environment 200 in which a geolocation system of the type disclosed in the above-referenced U.S. Patents to Belcher et al, U.S. Pat. Nos. 5,920,287, and 5,995,046, and described above with reference to FIG. 1 may be installed. In the illustrated example, the environment 200 has a generally rectangular defined by four, rectangle-defining, perimeter walls 201, 202, 203 and 204, and also having an interior wall 205 that subdivides the monitored environment 200 into two adjacent sections 211 and 212. In addition, the interior wall 205 is shown as having a doorway 206 that provides a passageway between sections 211 and 212.

In the present example, it will understood that the tagged objects do not move frequently (for example, the objects may be comprise an inventory of parts or pieces of equipment retained in storage) and/or the tagged objects in one of the sections 211 and 212 would normally not be expected to be moved to the other section. As such, each of the tags 16 may be programmed to normally 'blink' an encoded RF burst at a relatively slow repetition rate. However, should any tagged object be moved and pass through the doorway, it is desired to have immediate knowledge of that passage, as well as subsequent tracking of the movement of the object.

Figure 3:
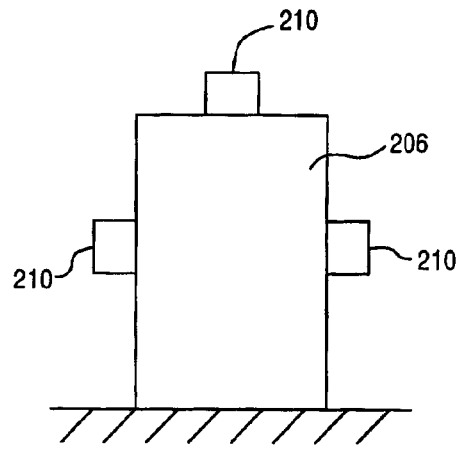
FIG. 3 is a diagrammatic elevation view of a portion of the monitored environment of FIG. 2.

To satisfy this objective, the present invention augments the tagged object tracking system of FIG. 1 in two ways. First, it places one or more relatively short range, magnetic field proximity-based, tag-programming generators proximate to the region of interest—here a region 207, shown in broken lines in the proximity of the doorway 206. As shown in FIG. 2 and in the diagrammatic elevation view of FIG. 3, a plurality of relatively reduced range magnetic field generators or ('pingers') 210 may be placed above and along sides of the doorway 206, so as to ensure complete spatial coverage for the doorway and accommodate any orientation of the tagged objects passing through it. The pinger may also be configured in the form of a hand-held wand, similar to a bar code scanner, so as to provide the capability of programming a tag via a connection to a personal computer, portable data terminal, and the like, or by simply pulling a trigger on the wand.

Due to its relatively short coverage range, such a magnetic field pinger is especially suited for confined space applications, such as doorways, gates, and the like. The low frequency of the pinging electromagnetic field is capable of penetrating thin metals such as foils, where radio signals are totally blocked. In addition, the use of a short range pinger means that a large number of pingers and tags may be used in a single facility without interfering with one another. The second augmentation involves modifying the transceiver architecture of a respective tag to incorporate a magnetic field sensor that will enable the tag to appropriately respond to the encoded AC magnetic field generated by pinger 220.

In accordance with a non-limiting, preferred embodiment, each of the magnetic field generator (pinger) and the tag-installed magnetic field sensor may be respectively configured as described in the above referenced '340 application. As diagrammatically illustrated in FIG. 4, the magnetic field generator 210 generates a non-propagating magnetic field 220, which is modulated or encoded with prescribed information to be demodulated by receiver circuitry 230, to which the output of a magnetic field sensing unit 240 of a respective tag 16 (that has come within the magnetic field sensing proximity of the generator 210) is coupled. As described in the '340 application, the magnetic field generator 210 is preferably operative to produce an AC magnetic field 220 that is modulated with frequency shift keyed (FSK) modulation signals representative of digital data to be transmitted to the tag.

Figure 5:
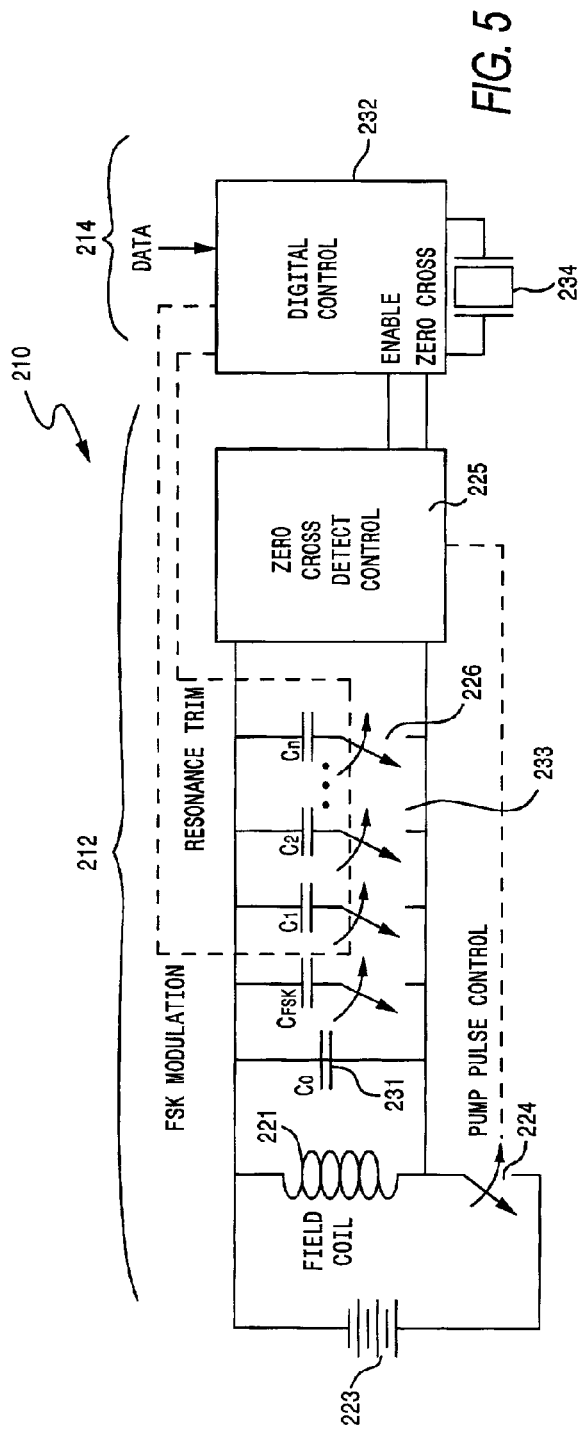
FIG. 5 shows a first embodiment of a magnetic field generator or pinger.

As shown in FIG. 5, magnetic field generator 210 may comprise an analog section 212, which is configured to generate and FSK-modulate the non-propagating magnetic field, and a digital section 214 that is operative to convert stored data or an incoming digital data stream into control signals that controllably switch the resonant frequency of magnetic coil—capacitor components of the analog section 212 between first and second precisely calibrated or pre-tuned frequency values, and thereby effect FSK-modulation of the generated magnetic field in accordance with the digital data. It is to be understood that the data may be augmented by additional coding such as Manchester coding, and/or a cyclic redundancy check (CRC) sequence.

The analog section 212 includes a magnetic field coil 221, to which a relatively large amplitude energizing current is supplied by a DC power supply or battery 223 is coupled to the field coil 221 by way of a 'pumping' switch 224. The magnetic field coil 221 is small compared to the operating frequency and the volumetric extent of the resonant magnetic field 220 produced thereby, so that the energy in the magnetic field that emanates from and surrounds the coil is not propagated, but is physically confined relatively close to the coil, as in a typical solenoid. The curving electromagnetic field generated by the pingers is virtually impossible to defeat by tag orientation. This serves to provide substantially strong coupling of the magnetic field with the sensing coil of a tag proximate thereto. (As pointed out above, distributing one or more such magnetic field generators around a region of interest (such as above and alongside a doorway) ensures complete coverage of the region.)

A zero-crossing detector 225 is coupled in parallel with a resonant ('tank' or 'ringing') circuit formed by the field coil 221 and one or more capacitors 231 of a capacitor circuit 233, and serves to periodically close open the pumping switch 224 in a fly-back manner, to provide a DC current boost to the coil 221 from the battery, compensating for resistive losses in the ringing circuit. The pumping signal generated by the zero-crossing detector 225 provides for switch closure at or near the point at which the resonating current signal in the tank circuit crosses zero. This pumping signal has a duration for a small fraction of a cycle of the resonant frequency of the magnetic field, and may be optimized for the intended range of operation of the generated field and the size of the coil 221. The zero-crossing points of the resonant frequency are supplied to a supervisory microcontroller 232, for control of capacitor insertion switches 226 of the capacitor circuit 233 and thereby FSK modulation of the resonant magnetic field. Selective closure of one or more of the switches 226 by the supervisory microcontroller 232 in accordance with respective binary states of the digital data stream places two or more capacitors 231 in parallel, thereby controllably tuning the resonant frequency of the encoded magnetic field.

The clock reference employed by the microcontroller 232 to control the switches 224 may use the coil 221 and one of the capacitors of the tank circuit, or a separate clock source, such as a crystal oscillator 234. This separate clock source serves as a reference for the microcontroller 232 for measuring the resonant frequency established by the tank circuit at transmitter initialization and periodically thereafter. This ensures that the two resonant frequencies used for FSK modulation are within spec.

During calibration, small valued capacitors may be controllably switched in and out of the tank circuit to determine the optimum frequency matches for the desired frequency pair. Thereafter, during data transmission, these 'best match' capacitors are switchably employed to define the resonant frequencies associated with the binary states of the digital data. As a non-limiting example, FSK-modulation frequency pair may comprise frequencies F1=114.7 kHz and F2=147.5 kHz. These frequencies provide for low power and low cost receiver and demodulator components. In addition, they are readily distinguishable from other normal factory background electrical and electronic noise.

Figure 6:
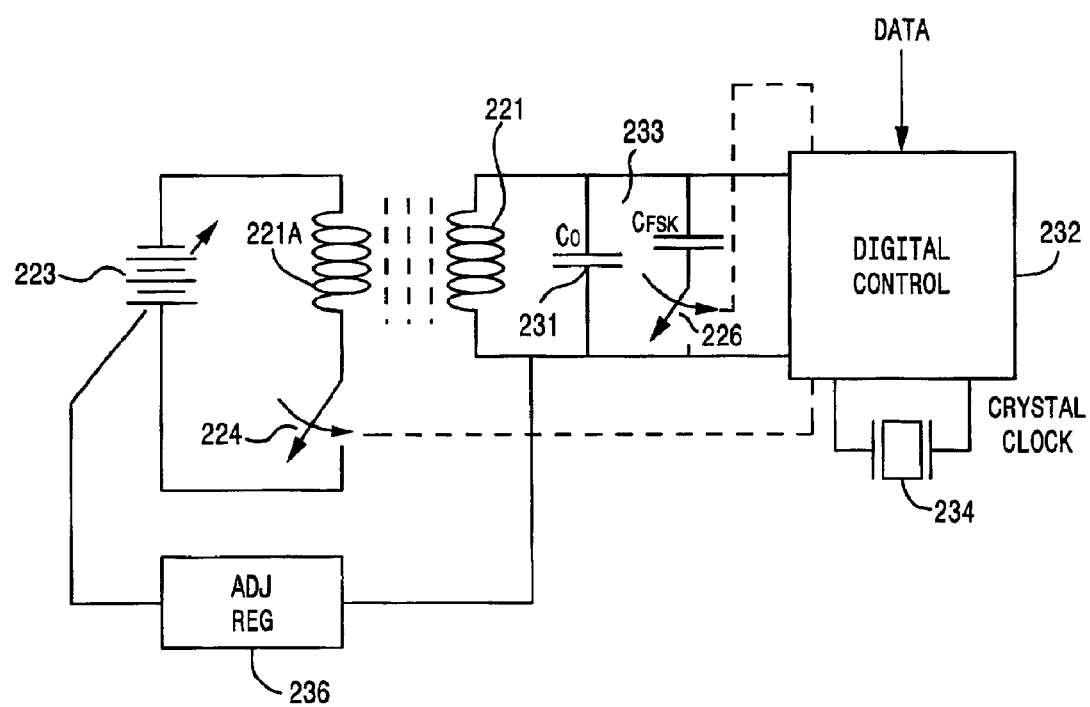
FIG. 6 shows an alternative embodiment of a magnetic field generator.

FIG. 6 shows a reduced hardware complexity embodiment of the magnetic field generator 210. In this embodiment, microcontroller 232 controls the pulse timing and duration used to pump the field coil 221. This configuration eliminates some of the analog circuitry at the cost of requiring accurate, temperature-stable components in the resonant LC network, and may be preferred in small battery-operated and portable applications. As shown, a relatively low inductance, auxiliary coil 221A is transformer-coupled with the high inductance field coil 221. The auxiliary coil 221A is coupled to the battery through the pumping switch 224, which is controlled directly by the microcontroller 232. As the tank circuit is DC-isolated from the pumping switch, a relatively simple switch can be used.

Each of the magnetic field generator configurations of FIGS. 5 and 6, when employed in heavy industrial applications, benefits from a power control loop, to allow for correction of the magnetic field level, thereby maintaining communication performance, when the system is affected by the proximity of a large metallic body such as a passing automobile or forklift. For this purpose, the power source 223 is adjusted appropriately by a control signal generated by monitoring the level of the voltage present in the resonant LC circuit. The power source 223 may be controllably varied by means of an adjustable regulator 236, wherein the detected resonant circuit voltage is fed back via a feed back link to the adjustment portion of the regulator, to form a closed control loop.

Figure 7:
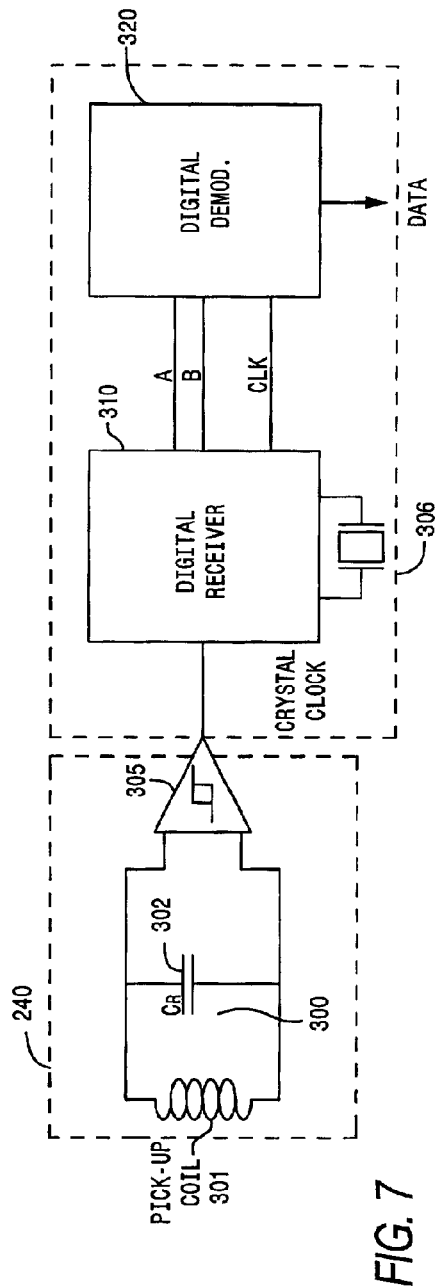
FIG. 7 diagrammatically illustrates the configuration of a magnetic field receiver unit for use with the pingers of FIGS. 5 and 6.

FIG. 7 diagrammatically illustrates the configuration of a magnetic field sensing unit 240 for a respective tag as comprising a comprising a resonant (LC tank) detector circuit 300 having a magnetic field-sensing coil 301 coupled in parallel with a capacitor 302. The parameters of the tank circuit components are such that the tank circuit 300 resonates at a frequency between the two FSK frequencies employed by the FSK-modulating magnetic field generator 210. For the nonlimiting example of using frequencies of F1=114.7 kHz and F2=147.5 kHz, referenced above, the tank circuit 300 may have a resonant frequency of 131 kHz.

The resonant tank circuit 300 is coupled to a sense amplifier 305, which amplifies the voltage produced by the tank sensor circuit for the desired receiver sensitivity and buffers the detected voltage to the appropriate logic level for use by a digital receiver—demodulator 306. The digital receiver—demodulator 306 includes a digital receiver 310, that is referenced to a crystal clock 312. For the present example, the receiver clock is set to a frequency that corresponds to the difference between the FSK frequencies of the selected modulation pair F1/F2. Thus, for the current example of employing transmitter frequencies of 114.7 kHz and 147.5 kHz, the receiver clock may be set at 32.8 kHz. This reduced clock frequency serves maintains very low power consumption at low cost. The use of such a relatively low reference frequency in the receiver requires a slower data rate, since one clock cycle of the receiver clock represents only 3.4–3.8 FSK clock cycles.

As described in the '340 application, the digital receiver 310 may employ complementary buffer paths A/B that operate on alternate sample periods one-half the period of the received data spread code. This ensures that at least one of the two buffer paths will not be sampling data during transitions in the received FSK frequency. The receiver integration time is sufficiently long to count the number of rising edges in a received FSK signal, and readily differentiate between the two valid FSK frequencies (here, F1=114.7 kHz and F2=147.5 kHz), to determine when a frequency change occurs, and to reject other FSK signals and/or noise.

The digital demodulator 320 contains a state machine that demodulates the data by comparing a received sequence of FSK tones with a predefined start-of-message sequence (corresponding to a start synchronization code). As a non-limiting example, the start-of-message sequence may comprise a plurality of successive samples at one FSK frequency or tone (such as three symbol periods at the higher of the two FSK tones), followed by a plurality of successive samples at the second FSK frequency (e.g., three symbol periods at the lower of the two FSK tones). Upon detecting this sequence, the state machine initializes the data demodulation circuitry, so that the data may be clocked out as it is detected and demodulated.

As is customary in FSK-based modulation systems, data values of '1' and '0' are represented by respectively difference sequences of the two FSK tones. As a non-limiting example, a logical 'one' may correspond to one symbol period at the higher FSK tone (147.5 KhZ) followed by one spreading chip period at the lower FSK tone (114.7 kHz); a logical 'zero' may correspond to one symbol period at the lower FSK tone (114.7 kHz), followed by one symbol period at the higher FSK tone (147.5 KhZ). Similar to detecting the start of a message, the demodulator's state machine may detect the end of a message by comparing a received sequence of FSK tones with a predefined end-of-message sequence. As a non-limiting example, the end-of-message sequence may be complementary to the start-of-message sequence, described above.

In an alternative embodiment the receiver may employ a phase detector a quadrature phase shift circuit resonant at the center of the two FSK tones. This alternative embodiment eliminates the requirement for a large spectral separation between the tones, so as to allow a narrower receiver bandwidth with better sensitivity and reduced susceptibility to interference. For example, the higher FSK tone may be reduced to 127 KHz, while still using the efficient 32.8 KHz system clock.

Figure 4:
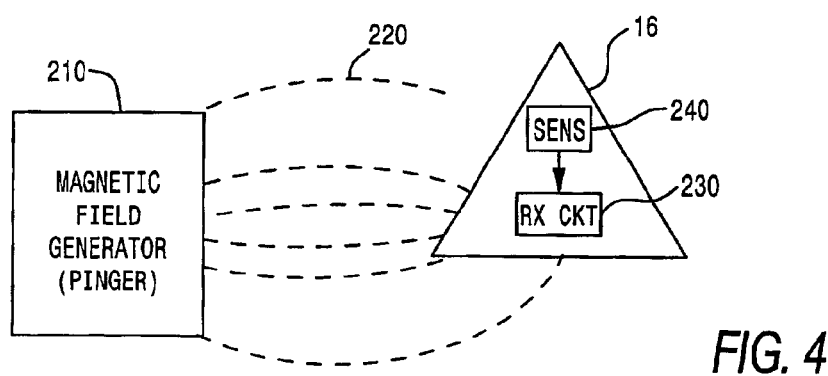
FIG. 4 diagrammatically illustrates the magnetic field coupling of a magnetic field generator or pinger with a magnetic field sensor of a tag transceiver.
Figure 8:
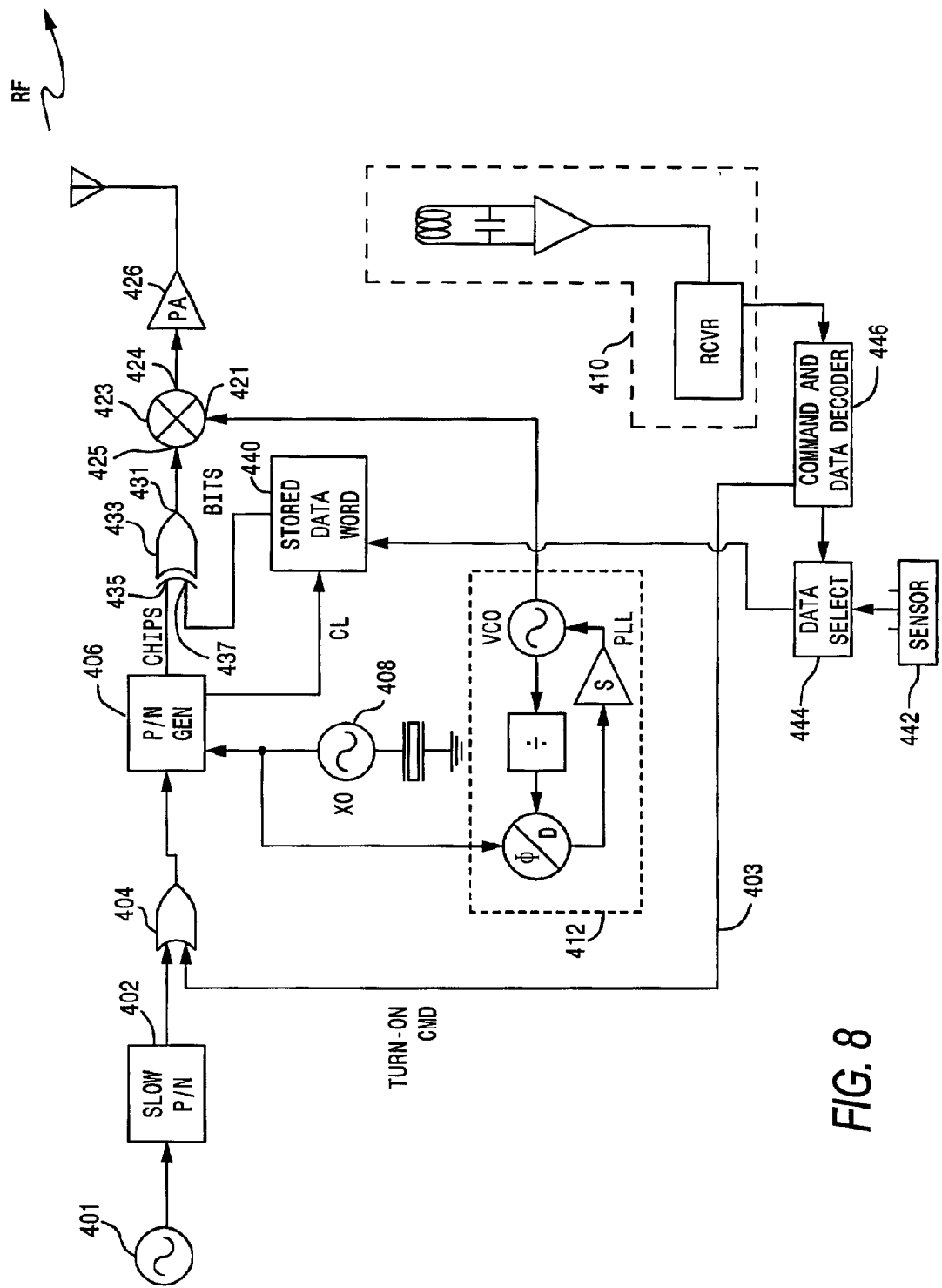
FIG. 8 shows the manner in which a tag transceiver unit of the radio location and tracking system of the Belcher et al patents may be modified to incorporate a magnetic field receiver.

FIG. 8 shows the manner in which the circuit architecture of a tag transceiver (transmitter—transponder) unit employed in the radio location and tracking system of the type detailed in the above-referenced Belcher et al patents (such as that shown in FIG. 4 of U.S. Pat. No. 5,920,287) may be modified to incorporate an encoded magnetic field receiver, such as that disclosed in the '340 application and described above with reference to FIG. 7. As shown in FIG. 8, the augmented tag transceiver comprises an oscillator 401, the output of which is coupled to a variable pseudo random (PN) pulse generator 402.

The PN generator 402 is normally operative to generate series of relatively low repetition rate (for example, from tens of seconds to several hours), randomly occurring 'blink' pulses that are coupled through an OR gate 404 to a high speed PN spreading sequence generator 406. These blink pulses define when the tag randomly transmits or 'blinks' bursts of wideband (spread spectrum) RF energy to be detected by the tag transmission readers, in order to locate and identify the tag using time-of-arrival geometry processing of the identified first-to-arrive signals, as described above. The PN generator 402 is also coupled to receive a control signal on line 403 from magnetic field sensing circuitry of the type shown in FIG. 7, and depicted generally in broken lines 410.

In response to the tag's magnetic field sensing circuitry demodulating a blink rate reprogramming message, FSK-modulated onto the magnetic field generated by the magnetic field generator (pinger), it couples a blink rate change signal (e.g., changes the binary state of line 403 from its default, low blink rate representative level to a high blink rate logic level) to the variable PN generator 402. This increases the pulse rate at which 'blink' pulses are produced by generator and coupled through OR gate 404 to the high speed PN spreading sequence generator 406. As a consequence the tag blinks at an increased rate and thereby alert the tracking system of the proximity of the tagged object to an 'increased sensitivity' region where the magnetic field generator is installed.

In response to an enabling 'blink' pulse, the high speed PN spreading sequence generator 406 generates a prescribed spreading sequence of PN chips. The PN spreading sequence generator 406 is driven at the RF frequency output of a crystal oscillator 408. This crystal oscillator provides a reference frequency for a phase locked loop (PLL) 412, which establishes a prescribed output frequency (for example a frequency of 2.4 GHz, to comply with FCC licensing rules). The RF output of PLL 412 is coupled to a first input 421 of a mixer 423, the output 424 of which is coupled to an RF power amplifier 426. Mixer 423 has a second input 425 coupled to the output 431 of a spreading sequence modulation exclusive-OR gate 433. A first input 435 of the exclusive-OR gate 431 is coupled to receive the PN spreading chip sequence generated by PN generator 406. A second input 437 of exclusive-OR gate 431 is coupled to receive the respective bits of data stored in a tag data storage memory 440, which are clocked out by the PN spreading sequence generator 406.

The tag memory 440 may comprise a relatively low power, electrically alterable CMOS memory circuit, which stores a multibit word or code representative of the identification of the tag. The tag memory 440 may also store additional parameter data, such as that provided by an associated sensor (e.g., a temperature sensor) 442 installed on or external to the tag, and coupled thereto by way of a data select logic circuit 444. The data select logic circuit 444 is further coupled to receive data transmitted to the tag by the FSK-modulated magnetic field generator, described above, and demodulated by the magnetic field sensing circuit 410. For this purpose the demodulated data is decoded by a command and data decoder 446. The data select logic circuit 444 may implemented in gate array logic and is operative to append any data it receives to that already stored in the tag memory 440. It may also selectively couple sensor data to memory, so that the tag will send only previously stored data. It may also selectively filter or modify data output by the command and data decoder 446.

When a magnetic field-modulated message from the magnetic field generator is detected by the receiver 410, the data in the decoded message is written into the tag memory 440, via the data select logic circuit 444. The command and data decoder 446 also couples a signal through OR gate 404 to the enable input of the PN generator 406, so that the tag's transmitter will immediately generate a response RF burst, in the same manner as it randomly and repeatedly 'blinks', a PN spreading sequence transmission containing its identification code and any parameter data stored in memory 440, as described above.

As will be appreciated from the foregoing description, the desire to communicate with or controllably modify the operation of a tag whose object comes within a prescribed region (e.g., passes through a passageway) of a monitored environment, is readily accomplished in accordance with the present invention, by placing an arrangement of one or more relatively short range, magnetic field proximity-based, tag-programming 'pingers' at a respective location of the monitored environment that is proximate to the region through which a tag may pass. The pinger may be readily implemented and the tag transceiver augmented in accordance with the respective magnetic field generator and tag-installed magnetic field sensor architectures described in the above referenced '340 application.

As a non-limiting example, the magnetic field generator may be installed on a fork-lift, so that a tagged item being moved by the fork-lift will receive the increased blink rate command. This will allow continuous tracking of a tagged item, as it is being moved by the fork-lift. After the fork-lift has transported and deposited the tagged item, and then leaves the proximity of the tagged item, the tag will again resume its previous slow blink rate, thus conserving battery life.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling the operation of a system for geolocating objects within a monitored environment, wherein RF transmissions from tags associated with said objects are detected at a plurality of spaced apart monitoring locations containing tag transmission readers, and outputs of said tag transmission readers are coupled to an object location processor which processes outputs of said tag transmissions to geolocate said tags and thereby their associated objects within said monitored environment, said method comprising the steps of:

(a) generating, from at least location of the monitored environment that is proximate to a region which a tagged object may enter, a magnetic field encoded with information intended for a tag entering said region; and (b) at a tag that has entered said region, detecting said magnetic field and causing said tag to perform a prescribed function.

2. A method according to claim 1, wherein step (b) comprises causing said tag to change the repetition rate of RF transmissions therefrom.

3. A method according to claim 1, wherein step (b) comprises causing said tag to increase the repetition rate of RF transmissions therefrom while said tag is proximate to said region, and thereafter causing said tag to revert to its previous repetition rate after said tag is no longer proximate to said region.

4. A method according to claim 1, wherein step (a) comprises providing a distribution of magnetic field generators proximate to said region, and causing said distribution of magnetic field generators to generate a plurality of magnetic fields encoded with said information and which provide complete spatial coverage for said region irrespective of the orientation of said tag.

5. A method according to claim 4, wherein said region comprises a passageway connecting separate portions of, or has mobility within, said monitored environment.

6. A method according to claim 1, wherein step (a) comprises frequency shift key encoding said magnetic field in accordance with said information.

7. A method according to claim 1, wherein said magnetic field is capable of penetrating media that block radio signals.

8. An arrangement for controlling the operation of a system for geolocating objects within a monitored environment, wherein RF transmissions from tags associated with said objects are detected at a plurality of spaced apart monitoring locations containing tag transmission readers, and outputs of said tag transmission readers are coupled to an object location processor, which processes said outputs of said tag transmissions to geolocate said tags and thereby their associated objects within said monitored environment, said arrangement comprising:

at least one magnetic field generator located proximate to a region which a tagged object may enter, and being operative to generate a magnetic field encoded with information intended for a tag entering said region; and a magnetic field receiver installed on said tag and being coupled with RF transmission circuitry of said tag, and being operative, in response to detecting said magnetic field, to cause said tag to perform a prescribed function.

9. An arrangement according to claim 8, wherein said magnetic field receiver is operative to cause said tag to change the repetition rate of RF transmissions therefrom.

10. An arrangement according to claim 8, wherein said magnetic field receiver is operative to cause said tag to increase the repetition rate of RF transmissions therefrom while said tag is proximate to said region, and to cause said tag to revert to its previous repetition rate after said tag is no longer proximate to said region.

11. An arrangement according to claim 8, wherein said at least one magnetic field generator comprises a distribution of magnetic field generators proximate to said region, which are operative to generate a plurality of magnetic fields encoded with said information and provide complete spatial coverage for said region irrespective of the orientation of said tag.

12. An arrangement according to claim 9, wherein said region comprises a passageway connecting separate portions of, or has mobility within, said monitored environment.

13. An arrangement according to claim 9, wherein said at least one magnetic field generator is operative to frequency shift key encode a magnetic field generated thereby in accordance with said information.

14. An arrangement according to claim 9, wherein said magnetic field is capable of penetrating media that block radio signals.

15. An arrangement according to claim 9, wherein said magnetic field generator is capable of programming said tag.

16. An arrangement according to claim 9, wherein said magnetic field generator is configured to selectively address multiple tags or individual tags located proximate to said region.

17. For use with a system for geolocating objects within a monitored environment, wherein RF transmissions from tags associated with said objects are detected at a plurality of spaced apart monitoring locations containing tag transmission readers, and outputs of said tag transmission readers are coupled to an object location processor, which processes said outputs of said tag transmissions to geolocate said tags and thereby their associated objects within said monitored environment, an arrangement for controlling the operation of a tag that comes within a prescribed proximity of prescribed region of said monitored environment, said arrangement comprising:

at least one magnetic field generator located proximate to said region and being operative to generate at least one magnetic field modulated with information used to control the operation of said tag; and a magnetic field receiver installed on said tag and being coupled with RF transmission circuitry of said tag, and being operative, in response to detecting information modulated on said at least one magnetic field by said at least one magnetic field generator, to cause said tag to increase the rate of RF transmissions thereby.

18. An arrangement according to claim 17, wherein said at least one magnetic field generator comprises a distribution of magnetic field generators proximate to said region, which are operative to generate a plurality of limited range magnetic fields encoded with said information and arranged to provide complete magnetic field spatial coverage for said region irrespective of the orientation of said tag.

19. An arrangement according to claim 18, wherein said region comprises one of a passageway connecting separate portions of or has mobility within said monitored environment.

20. An arrangement according to claim 18, wherein said at least one magnetic field generator is operative to frequency shift key encode at least one magnetic field generated thereby in accordance with said information.

* * * * *